(12) United States Patent
Hulse

(10) Patent No.: US 7,241,039 B2
(45) Date of Patent: Jul. 10, 2007

(54) LED LIGHTING SYSTEM WITH HELICAL FIBER FILAMENT

(75) Inventor: George R. Hulse, Arlington Heights, IL (US)

(73) Assignee: iLight Technologies, Inc., Chicago, IL (US)

( * ) Notice: Subject to any disclaimer, the term of this patent is extended or adjusted under 35 U.S.C. 154(b) by 0 days.

(21) Appl. No.: 11/482,412

(22) Filed: Jul. 7, 2006

(65) Prior Publication Data

US 2007/0009210 A1 Jan. 11, 2007

Related U.S. Application Data

(60) Provisional application No. 60/697,781, filed on Jul. 8, 2005.

(51) Int. Cl.
*G02B 6/00* (2006.01)
*F21V 7/04* (2006.01)

(52) U.S. Cl. .................. 362/551; 362/555

(58) Field of Classification Search ............ 362/551, 362/555, 568; 372/226; 359/337
See application file for complete search history.

(56) References Cited

U.S. PATENT DOCUMENTS

| 4,028,081 | A | | 6/1977 | Marcatili | 65/392 |
|---|---|---|---|---|---|
| 4,245,885 | A | | 1/1981 | Hodge | 385/22 |
| 5,015,842 | A | | 5/1991 | Fradenburgh et al. | 250/227.15 |
| 5,103,380 | A | * | 4/1992 | Lindner et al. | 362/568 |
| 6,496,301 | B1 | * | 12/2002 | Koplow et al. | 359/337 |
| 6,650,664 | B1 | * | 11/2003 | Moore et al. | 372/6 |

* cited by examiner

*Primary Examiner*—Quyen Leung
(74) *Attorney, Agent, or Firm*—Stites & Harbison, PLLC; Jeffrey A. Haeberlin; David W. Nagle, Jr.

(57) ABSTRACT

A lighting system includes a helical light-transmitting fiber and an LED. The helical light-transmitting fiber is doped with a first wavelength converting material and defines a helical axis. The LED has a light-emitting portion for emitting light of a first color. The LED is aligned axially with the first helical fiber such that a portion of any light emitted by the LED will pass through the open space between the turns of the first helical fiber and a portion of any light emitted by the LED will be received by the first helical fiber and converted to light of a second color. Adjustment of the compression of the helical fiber will adjust the mixture of colors in the light emitted by the system. Further, the relatively small cross-sectional area of the fiber serves to lessen any dye migration in the fiber.

28 Claims, 14 Drawing Sheets

LED LIGHTING SYSTEM WITH HELICAL FIBER FILAMENT

CROSS-REFERENCE TO RELATED APPLICATIONS

The present application claims priority to U.S. Provisional Patent Application Ser. No. 60/697,781 filed on Jul. 8, 2005, the entire disclosure of which is incorporated herein by reference.

BACKGROUND OF THE INVENTION

The present invention relates to a light-emitting diode (LED) lighting system having a helical fiber "filament."

Lightweight, breakage resistant, high-intensity LEDs, have shown great promise to those interested in replacing conventional tungsten filament light sources. Nevertheless, a problem with such LEDs is that the available visible color spectrum is limited by the finite availability of LED colors. Therefore, in commonly assigned U.S. Pat. No. 7,011,421, and in commonly assigned and co-pending U.S. patent application Ser. No. 11/025,019, which are also incorporated in their entirety herein by this reference, illumination devices are described that uses fluorescent and phosphorescent dyes, thus allowing for emission of light in colors that cannot ordinarily be achieved by use of LEDs alone without significant increase in cost or complexity of the illumination device. However, it is further desirable to easily be able to adjust the color of the light emitted by such LED/dye systems.

Additionally, fluorescent dyes will migrate in a non-uniform illumination field. The non-uniform illumination field will cause dyes exposed to a higher intensity to vibrate and become "hot,", which then causes the dyes to migrate away from the higher intensity location. As the dyes migrate, the resulting color emitted by the LED/dye system will change. Thus, it is further desirable to reduce or eliminate dye migration in LED/dye systems.

BRIEF SUMMARY OF THE INVENTION

These needs, and others, are met by the invention.

Generally described, the invention is a lighting system including a first helical light-transmitting fiber and an LED. The first helical light-transmitting fiber is doped with a first wavelength converting material and defines a helical axis. The LED has a light-emitting portion for emitting light of a first color. The LED is aligned axially with the first helical fiber such that a portion of any light emitted by the LED will pass through the open space between the turns of the first helical fiber and a portion of any light emitted by the LED will be received by the first helical fiber and converted to light of a second color.

According to an aspect of the invention, the first helical fiber defines a cylindrical interior space and the LED is a side-emitting LED positioned with the light-emitting portion inside of the first helical fiber interior space. The system further has a cup-shaped light-collecting and mixing element having a side wall, a closed end, an open end, and an interior area. The light-collecting and mixing element is aligned axially within the first helical fiber such that the light-emitting portion of the LED and the first helical fiber are received with the light-collecting and mixing element interior area. The light-collecting and mixing element collects and mixes both the light of a first color and the light of a second color, and directs the mixed light out the open end. The system further includes a means of adjusting the compression of the first helical fiber for adjusting the amount of open space between the turns of the first helical fiber, thereby changing the percentages of the light of the first color and the light of the second color that are emitted by the lighting system.

More specifically, the means of adjusting the compression includes a first separating element and a first plunger assembly. The separating element may be a light-transmitting tube. The plunger assembly may include a threaded shaft and a threaded shaft-receiving nut. The LED may have a base portion connected at one end of the light-transmitting tube. The threaded nut may be connected at the other end of the light-transmitting tube. The first helical fiber is positioned in the interior of the light-transmitting tube. The threaded shaft is rotationally received in the threaded nut, with one end of the shaft adjacent one end of the first helical fiber, such that rotation of the threaded shaft will adjust the compression of the first helical fiber and the open space between the turns of the first helical fiber.

The lighting system may also have a light-transmitting element positioned around an outer portion of the light-transmitting tube, or a light-reflecting element positioned around a portion of the interior surface of the light-collecting and mixing element. Both the light-transmitting element and the light-reflecting element would contain a second wavelength converting material, for converting a portion of the light emitted by the LED to a third color.

According to another aspect of the invention, the lighting system further has a second helical fiber having a diameter larger than the diameter of the first helical fiber positioned around and axially aligned with the first helical fiber. The second helical fiber is doped with a second wavelength converting material. The lighting system may further have a means of adjusting the compression of the second helical fiber that includes a second light-transmitting tube and a tubular plunger slidingly received within the second light-transmitting tube.

According to another aspect of the invention, the lighting system has a toroidal light-transmitting member having optical waveguide and light-scattering properties, and a light-directing housing for guiding light from the LED and the first helical fiber into the toroidal light-transmitting member. The light-directing housing may have a disk-shaped top reflector member covering a top portion of an opening defined by the toroidal light-transmitting member. The top reflector member may further be flexible for adjusting the compression of the first helical fiber.

According to yet another aspect of the invention, the lighting system may have a light-transmitting rod positioned such that at least a portion of the light-transmitting rod is inside of the first helical fiber. The LED is a top-emitting LED and is positioned to emit light into a proximate end of the light-transmitting rod. A reflector caps a distal end of the rod. The rod could be bulb-shaped.

According to a further aspect of the invention, the lighting system may have a light-transmitting tube positioned such that at least a portion of the light-transmitting tube is inside of the first helical fiber. A reflector may be formed inside of the light-transmitting tube to direct light out the sides of the tube. The lighting system may further have a means, such as a solenoid, of adjusting the compression of the first helical fiber. Still further, the system may have multiple fibers doped with different wavelength converting materials wound in parallel or in sections around the light-transmitting tube.

Another aspect of the invention utilizes an LED having a batwing radiation pattern and a fiber formed in a substantially dome-shaped helix having an open top corresponding to a uniform central radiation region of the LED. A cap sized to fit is placed over the open top of the dome-shaped helical fiber.

In one further embodiment, a light-transmitting rod encases the first helical fiber. The light-transmitting rod and the first helical fiber are aligned co-axially, and a top-emitting LED is positioned to emit light into an end of the light-transmitting rod.

DETAILED DESCRIPTION OF EXEMPLARY EMBODIMENTS OF THE INVENTION

The present invention is an LED lighting system having a helical fiber "filament."

A. First Exemplary Embodiment: Single Helical Fiber

Figure 1:
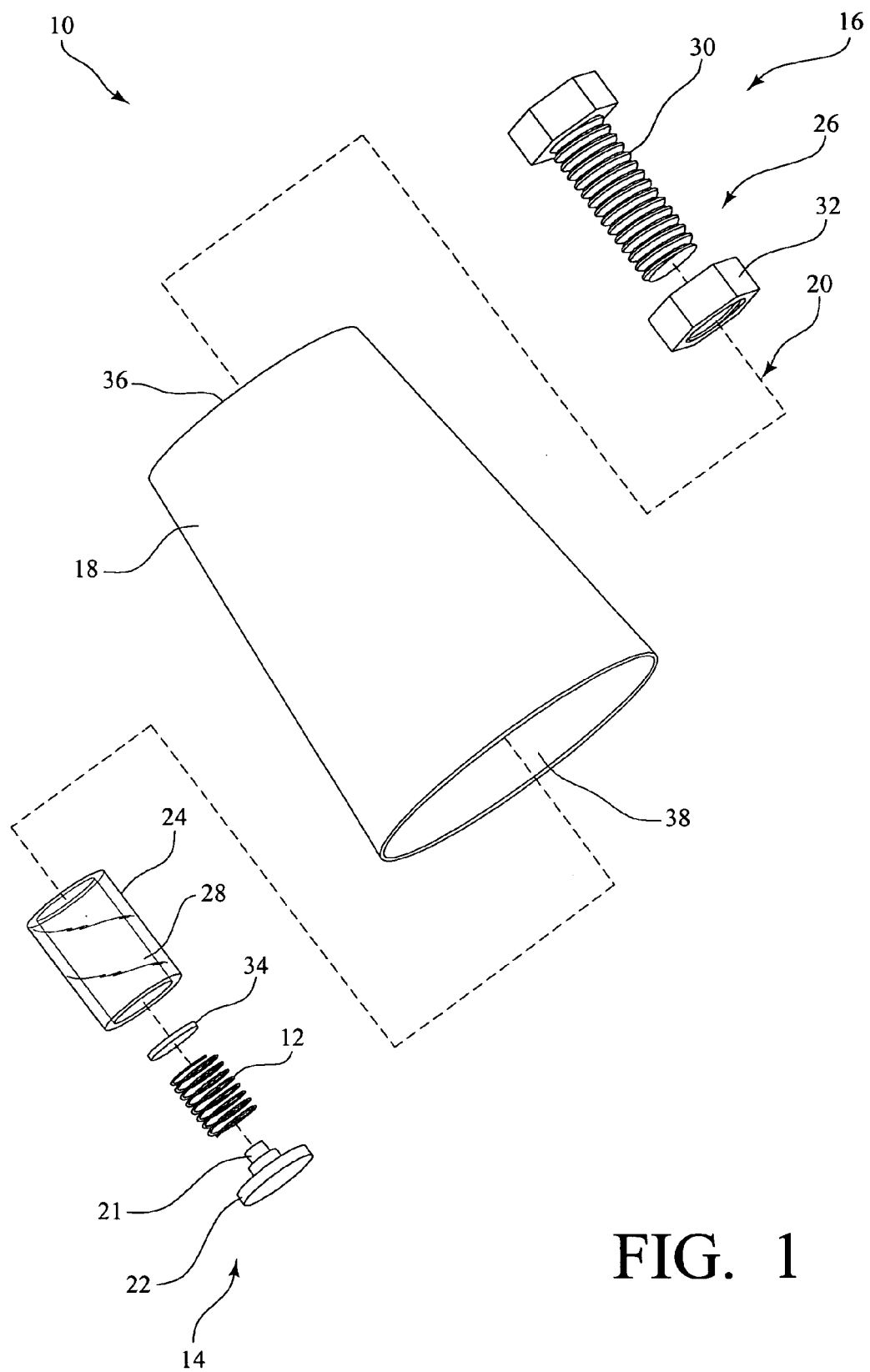
FIG. 1 is an exploded perspective view of a first exemplary embodiment of an LED lighting system having a helical fiber "filament" according to the invention.
Figure 2:
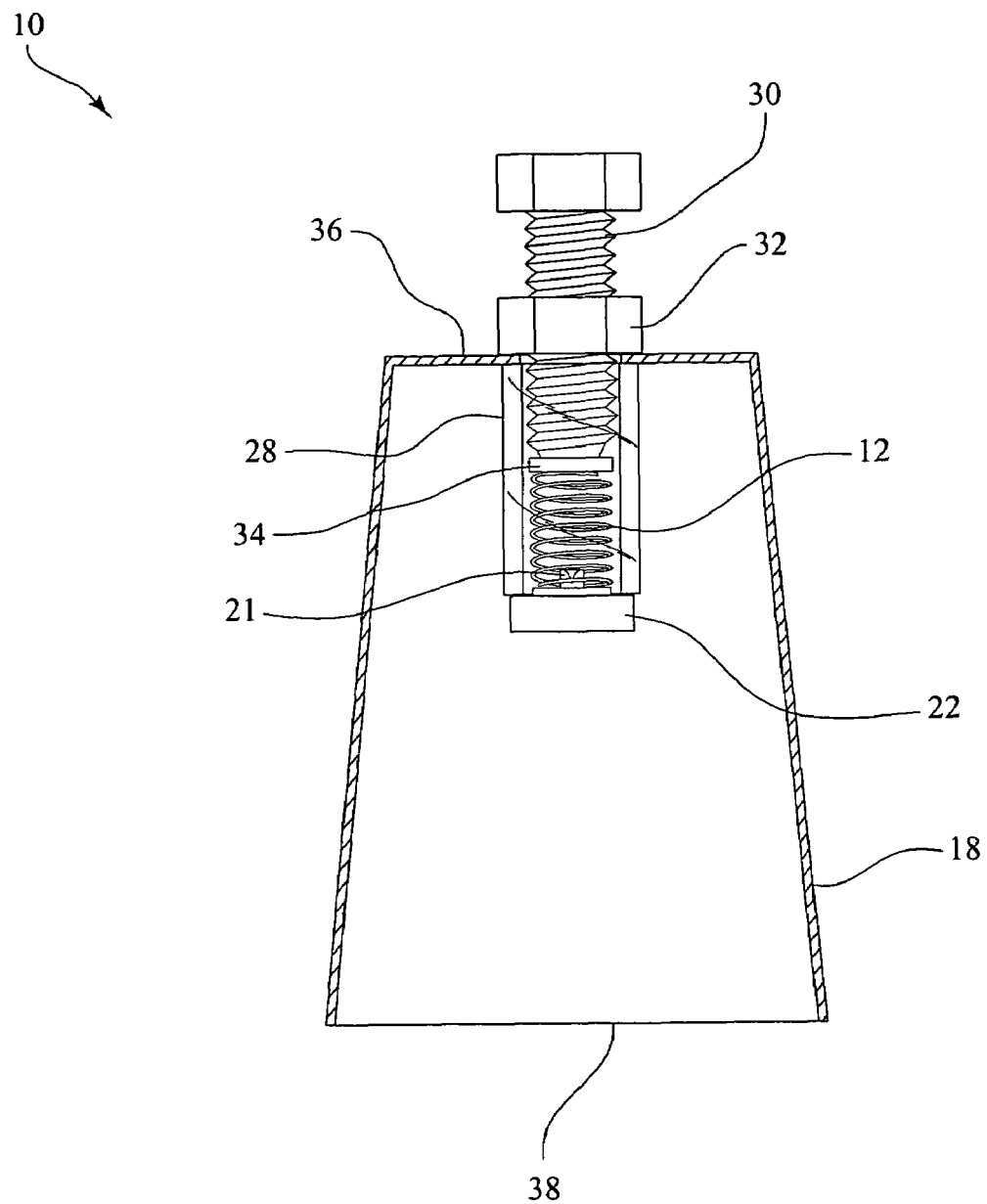
FIG. 2 is a side view of the first exemplary embodiment of an LED lighting system, with a portion of a light-collecting and mixing element cut away.

As shown in FIG. 1 and FIG. 2, a first exemplary embodiment 10 of an LED lighting system has a helical fiber 12, an LED 14, a means 16 of adjusting the compression of the helical fiber 12, and a light-collecting and mixing element 18.

The helical fiber 12 of the first exemplary embodiment is a light-transmitting fiber formed in the shape of a cylindrical coil, spiral or helix. The helical fiber 12 is doped with a wavelength converting material, such as a fluorescent or phosphorescent dye or pigment. The helical axis of the helical fiber 12 defines a central axis 20 of the LED lighting system 10. The helical fiber 12 may be made of either a clear or a frosted light-transmitting material, such as acrylic or the like.

The LED 14 of the first exemplary embodiment is a side-emitting LED. The LED 14 is aligned coaxially with the helical axis of the helical fiber 12 and the central axis 20 of the LED lighting system. Further, the LED 14 is positioned within the cylindrical interior space defined by the helical fiber 12. The LED 14 has a light-emitting portion 21 and a base portion 22. The LED base portion 22 provides for mechanical and electrical connection of the LED 14. Not shown, but known in the art, are components for operating the LED 14, including electrical wiring for supplying power to the LED 14, and any necessary heat sink elements for dissipating heat from the LED 14.

The means 16 of adjusting the compression of the helical fiber 12 of the first exemplary embodiment includes a separating element 24, a plunger assembly 26, and the LED base portion 22. The helical fiber 12 is positioned between the plunger assembly 26 and the LED base portion 22, with the separating element 24 separating the plunger assembly 26 from the LED base portion 22. More specifically, the separating element 24 of the first exemplary embodiment is a light-transmitting tube 28, and the plunger assembly 26 includes a threaded shaft 30 and a threaded shaft-receiving nut 32. The LED base portion 22 is connected at one end of the light-transmitting tube 28, positioning the LED light-emitting portion 21 in the interior of the light-transmitting tube 28. The threaded shaft-receiving nut 32 is connected at the other end of the light-transmitting tube 28. The helical fiber 12 is positioned in the interior of the light-transmitting tube 28, positioned around the LED light-emitting portion 21 and adjacent the LED base portion 22. The threaded shaft 30 is received in the threaded shaft-receiving nut 32 such that one end of the shaft 30 is adjacent the helical fiber 12. Additionally, the means 16 of adjusting the compression of the helical fiber may also have a disk member 34 positioned between the threaded shaft 30 and the helical fiber 12.

One of skill in the art will appreciate that other mechanical and electromechanical adjustment means, such as solenoids or the like, could be utilized for adjusting the compression of the helical fiber of the exemplary embodiments described herein without departing from the spirit or the scope of the invention described and claimed herein.

The light-collecting and mixing element 18 is cup-shaped and positioned coaxially with the central axis 20 of the LED lighting system 10 and around the LED light-emitting portion 21, the helical fiber 12 and a portion of the light-transmitting tube 28. The light-collecting and mixing element 18 has a closed end 36 and an open end 38. As shown in FIG. 1 and FIG. 2, the threaded shaft-receiving nut 32 may be attached to the outside of the closed end 36, and the closed end 36 may have an opening sized for allowing the threaded shaft 30 to protrude through the closed end 36 and into the interior of the light-collecting and mixing element 18.

In operation, the LED light-emitting portion 21 emits light of a first wavelength or color. A portion of the emitted light passes through the open space between the turns of the helical fiber 12, and a portion of the emitted light is received by the helical fiber 12 and converted to light of a second wavelength or color. The light-collecting and mixing element 18 collects and mixes both the light of a first color and the light of a second color, and directs the mixed light out the open end 38. Preferably, the LED 14 emits light having a wavelength in the blue region (relatively high energy and short wavelength) of the color spectrum, and the wavelength converting material in the helical fiber 12 converts a portion of the emitted light to a second color, such that the mixed light approximates the color and intensity of a conventional tungsten filament light source.

Advantageously, the plunger assembly 26 allows the open space between the turns of the helical fiber 12 to be adjusted by compressing or decompressing the helical fiber 12, thereby changing the percentages of the light of the first color and the light of the second color that are present in the mixed light, and the perceived color of the mixed light. Rotation of the threaded shaft 30 with respect to the threaded shaft-receiving nut 32 will cause compression or decompression of the helical fiber 12. The disk member 34 will prevent the helical fiber 12 from getting caught and twisted by the threaded shaft 30.

Also advantageously, the relatively small cross-sectional area of the fiber of the helical fiber 12 serves to lessen or eliminate any non-uniformity of the illumination field at any one point along the fiber, and thereby lessens or eliminates and dye migration that may occur as the result of the non-uniformity of the illumination field.

Figure 3:
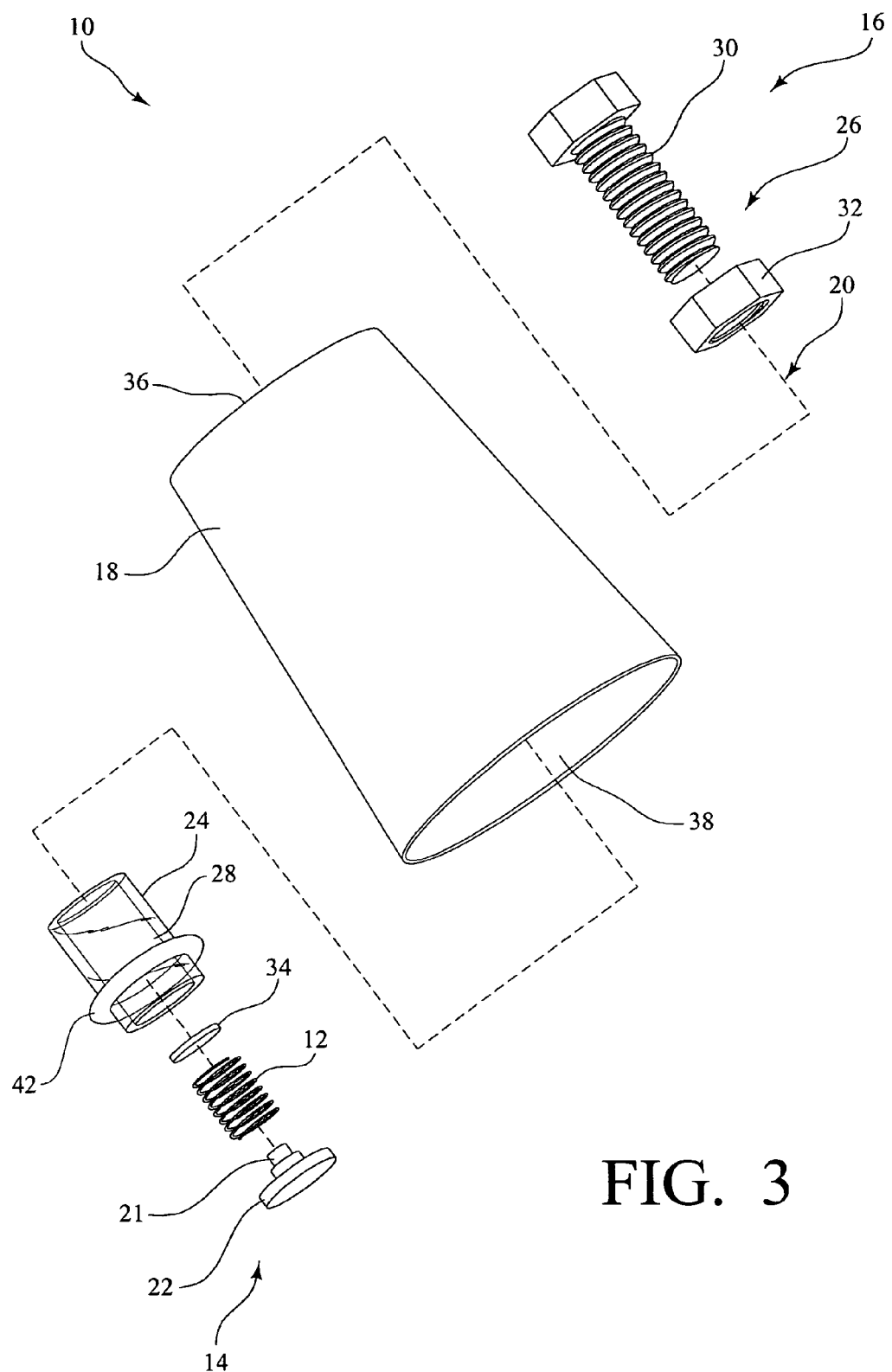
FIG. 3 is an exploded perspective view of a second exemplary embodiment of an LED lighting system according to the invention.

B. Second Exemplary Embodiment: Light-Transmitting Element Around Light-Transmitting Tube FIG. 3 shows a second exemplary embodiment 40 similar to the system previously described, but further having a small light-transmitting element 42, such as translucent tape, a second fiber, or a light-transmitting toroidal shaped element (as shown), doped with a different wavelength converting material positioned around an outer portion of the light-transmitting tube 28. In use, the light-transmitting element 42 adds another degree of adjustment of the color of the mixed light directed out of the open end 38 of the light-collecting and mixing element 18.

Figure 4:
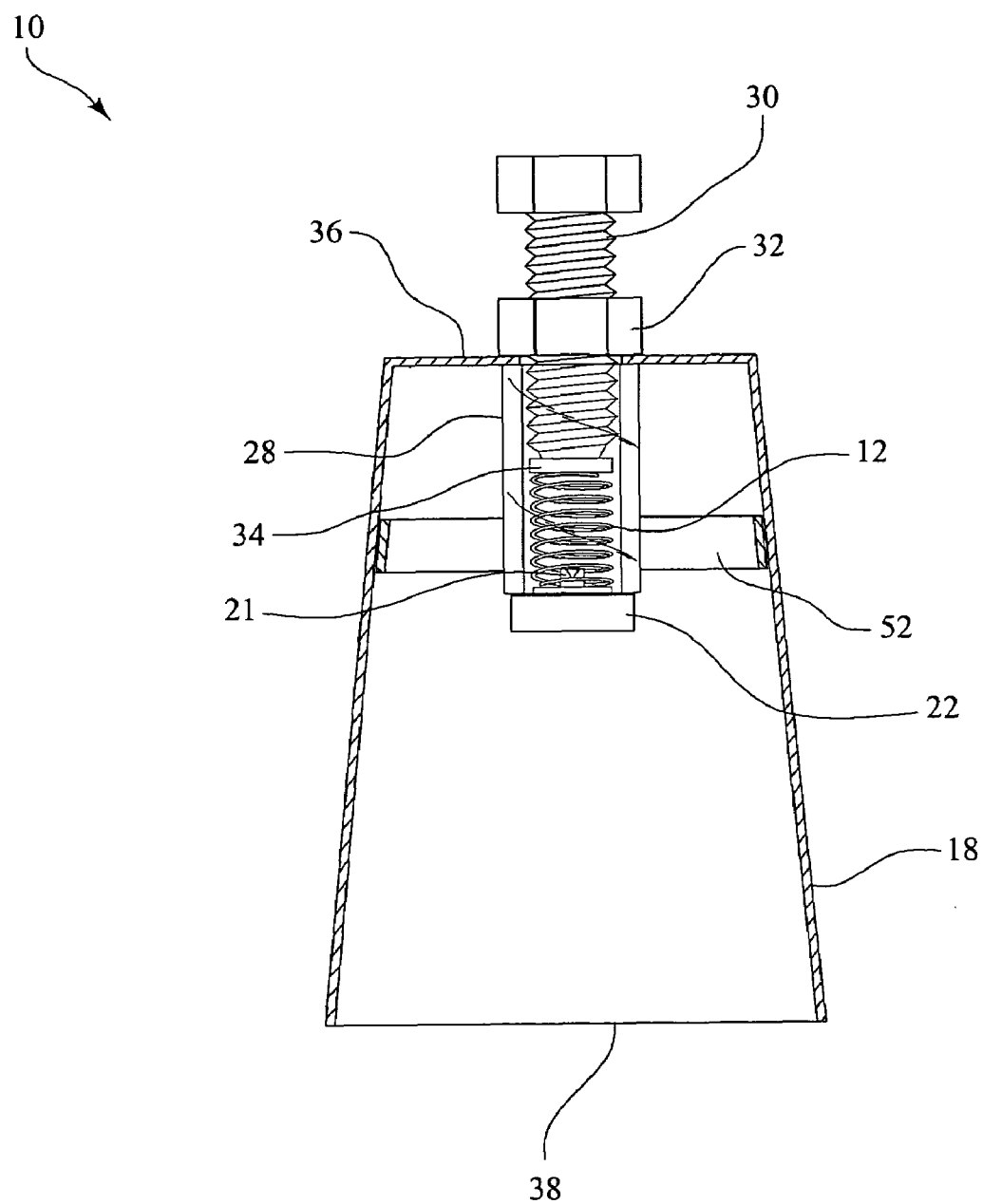
FIG. 4 is a side view of a third exemplary embodiment of an LED lighting system according to the invention, with a portion of a light-collecting and mixing element cut away.

C. Third Exemplary Embodiment: Light-Reflecting Element Around Interior Surface of Light-Collecting and Mixing Element Similarly, FIG. 4 shows a third exemplary embodiment 50 similar to the system described in conjunction with FIG. 1 and FIG. 2, but further having a light-reflecting element 52, such as a ring of reflective tape, a coating of paint, or the like, containing a different wavelength converting material positioned around a portion of the interior surface of the light-collecting and mixing element 18. In use, the light-reflecting element 52 also adds another degree of adjustment of the color of the mixed light directed out of the open end 38 of the light-collecting and mixing element 18.

D. Fourth Exemplary Embodiment: Double Filament

Figure 5:
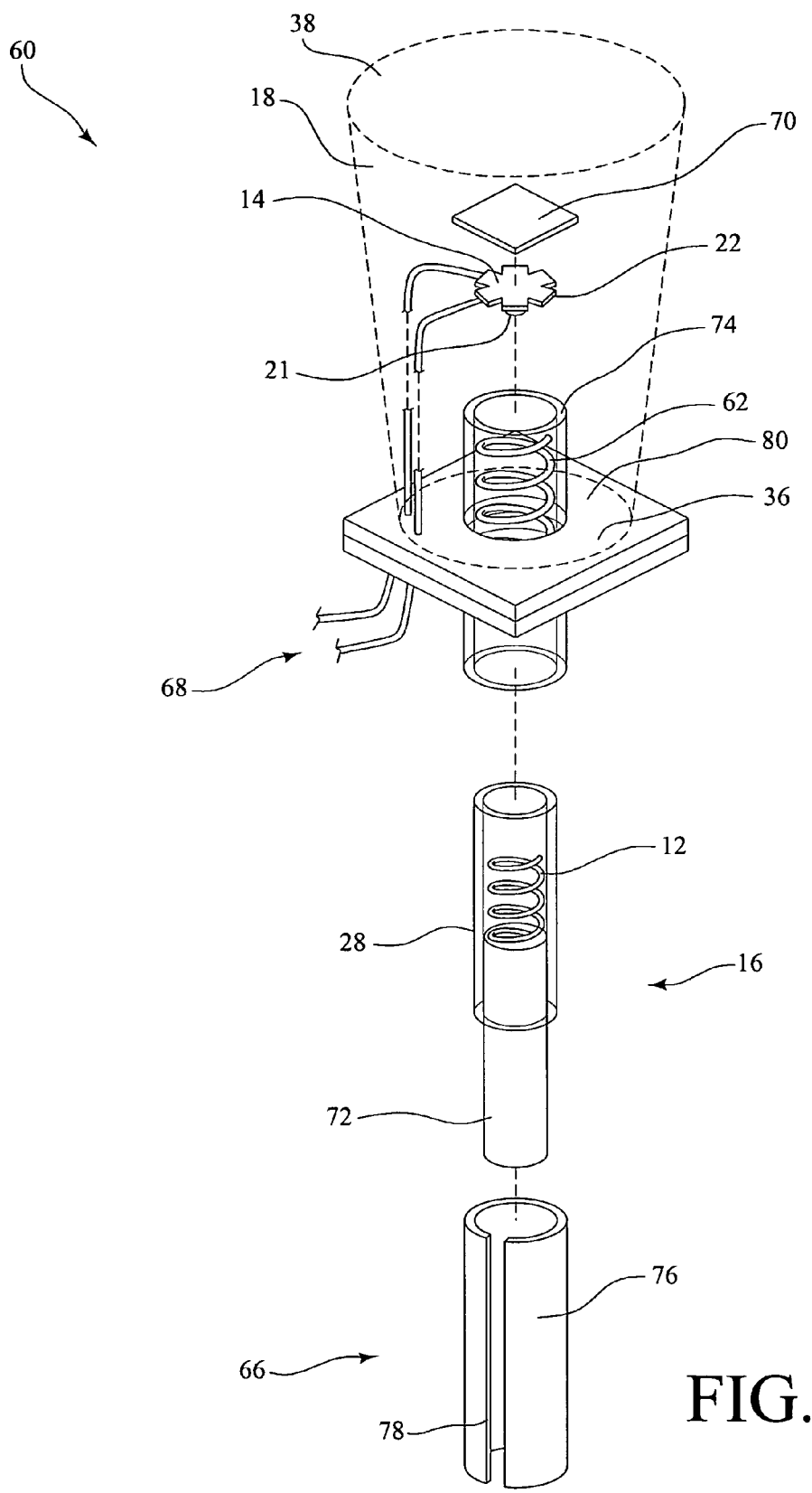
FIG. 5 is an exploded perspective view of a fourth exemplary embodiment of an LED lighting system according to the invention.

FIG. 5 shows still another exemplary embodiment 60 of an LED lighting system. As shown, similar to system described in conjunction with FIG. 1 and FIG. 2, the exemplary LED lighting system has a first helical fiber 12, an LED 14, a means 16 of adjusting the compression of the first helical fiber 12, and a light-collecting and mixing element 18. However, the exemplary embodiment of FIG. 5 also has a second helical fiber 62, and a means 66 of adjusting the compression of the second helical fiber 62.

The first helical fiber 12 and the second helical fiber 62 are both light-transmitting fibers formed in the shape of a cylindrical coil, spiral or helix. However, the second helical fiber 62 has a diameter that is larger than the diameter of the first helical fiber 12. The second helical fiber 62 is positioned around and is aligned coaxially with the first helical fiber 12. The first helical fiber 12 is doped with a first wavelength converting material, and the second helical fiber 62 is doped with a second wavelength converting material.

The LED 14 is also a side-emitting LED having a light-emitting portion 21 and a base portion 22. The LED 14 is positioned such that its light-emitting portion 21 is within the cylindrical interior space defined by the first helical fiber 12. Since the second helical fiber 62 is positioned around the first helical fiber 12, the LED 14 is, therefore, also positioned within the cylindrical interior space defined by the second helical fiber 62. Also shown are electrical leads 68 for supplying power to the LED 14, and a backing plate 70 that acts as a heat sink for dissipating heat from the LED 14.

The means 16 of adjusting the compression of the first helical fiber 12 includes a first light-transmitting tube 28 and a cylindrical plunger 72. The inner diameter of the first light-transmitting tube 28 is larger than the diameter of the first helical fiber 12, and the outer diameter of the first light-transmitting tube 28 is smaller than the diameter of the second helical fiber 62. The first light-transmitting tube 28 is positioned between the first helical fiber 12 and the second helical fiber 62. The diameter of the cylindrical plunger 72 is slightly smaller than the inner diameter of the first light-transmitting tube 28. The cylindrical plunger 72 is slidingly received within the first light-transmitting tube 28 with one end of the cylindrical plunger 72 adjacent one end of the first helical fiber 12. The first helical fiber 12 is positioned in the interior of the first light-transmitting tube 28 around the LED light-emitting portion 21 and between the LED base portion 22 and the cylindrical plunger 72.

The means 66 of adjusting the compression of the second helical fiber 62 includes a second light-transmitting tube 74 and a tubular plunger 76. The inner diameter of the second light-transmitting tube 74 is slightly larger than the diameter of the second helical fiber 62. The second light-transmitting tube 74 is positioned around second helical fiber 62. The diameter of the tubular plunger 76 is substantially the same as the diameter of the second helical fiber 62. The tubular plunger 76 is slidingly received between the second light-transmitting tube 74 and the first light-transmitting tube 28 with one end of the tubular plunger 76 adjacent one end of the second helical fiber 62. The second helical fiber 62 is positioned between the first light-transmitting tube 28 and the second light-transmitting tube 74 around the LED light emitting portion 21 and between the LED base portion 22 and the tubular plunger 76.

The light-collecting and mixing element 18 is cup-shaped and receives at least the LED light emitting portion 21, the first helical fiber 12, and the second helical fiber 62 in its cup-shaped cavity. The light-collecting and mixing element 18 is for collecting and mixing light from the LED light-emitting portion 21, the first helical fiber 12 and the second helical fiber 62. The light-collecting and mixing element 18 has a closed end 36 and an open end 38. The closed end may be formed from a reflecting plate 80 having a reflective interior surface. The closed end 36 may further have an opening sized for allowing the second light-transmitting tube 74 to protrude through the closed end 36 and into the interior of the light-collecting and mixing element 18 and for holding the second light-transmitting tube 74 in a fixed position.

Preferably, the tubular plunger 76 also has a longitudinal slot 78, for allowing support structure (not shown) to extend between the second light-transmitting tube 74 and the first light-transmitting tube 28, in order to hold the first light-transmitting tube 28 in a fixed position.

In operation, the LED light-emitting portion 21 emits light of a first wavelength or color. A portion of the emitted light passes through the open spaces between the turns of the first helical fiber 12 and the second helical fiber 62. A portion of the emitted light is received by the first helical fiber 12 and converted to a light of a second wavelength or color. A portion of the emitted light is received by the second helical fiber 62 and converted to a light of a third wavelength or color. Further, a portion of the light of a second wavelength may also be received by the second helical fiber 62 and converted to a light of a third wavelength. The light-collecting and mixing element 18 collects and mixes the light of a first color, the light of a second color, and the light of a third color, and directs the mixed light out the open end 38 of the light-collecting and mixing element 18.

Advantageously, the cylindrical plunger 72 and the tubular plunger 76 allow the open spaces between the turns of the first helical fiber 12 and the second helical fiber 62, respectively, to be adjusted by compressing or decompressing the first helical fiber 12 and the second helical fiber 62, thereby changing the percentages of the light of the first color, the light of the second color, and the light of the third color that are present in the mixed light, and the perceived color of the mixed light.

Figure 6:
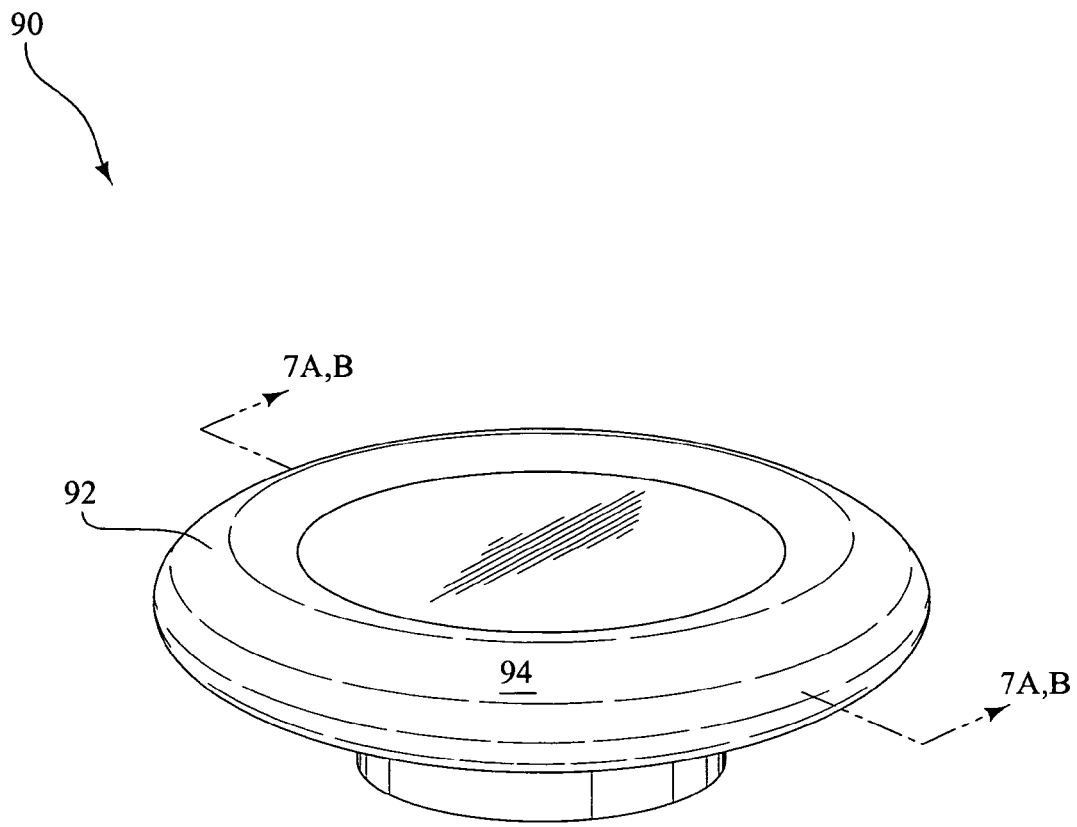
FIG. 6 is a perspective view of a fifth exemplary embodiment of a LED lighting system according to the invention.

E. Fifth Exemplary Embodiment: Illumination Device for Simulating Neon or Similar Lighting in the Shape of a Toroid FIG. 6 is a perspective view of a fifth exemplary embodiment 90 of an LED lighting system with a helical fiber filament. The fifth exemplary embodiment 90 is an illumination device for simulating neon or similar lighting in the shape of a toroid, such as described in co-pending and commonly assigned application Ser. No. 11/421,502, the entire disclosure of which is incorporated herein by reference.

The fifth exemplary embodiment 90 has a light-transmitting member 92 formed of a light-transmitting medium in the shape of a toroid. The light-transmitting member 92 has a light-emitting surface 94. In use, the light-transmitting member 92 emits light has a substantially uniform intensity or brightness along the light-emitting surface 94, simulating neon or similar lighting in the shape of a toroid.

Figure 7A:
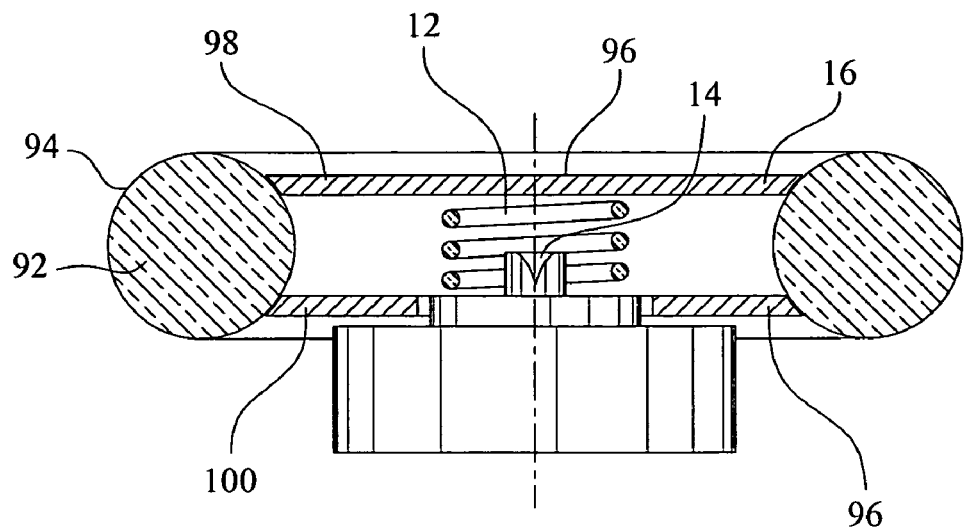
FIG. 7A and FIG. 7B are side sectional views of the LED lighting system of FIG. 6.

FIG. 7A is a side sectional view of the fifth exemplary embodiment 90 of FIG. 6. As shown, the exemplary embodiment 90 has the toroidal light-transmitting member 92, a helical fiber 12, an LED 14, a means 16 of adjusting the compression of the helical fiber 12, and a light-directing housing 96.

The light-transmitting member 92 is a "leaky" waveguide, having both optical waveguide and light scattering characteristics. As a result, the light-transmitting member 92 emits light along the light-emitting surface 94 with a uniformity and brightness that is characteristic of neon or similar lighting.

The LED 16 is located along the central axis of the toroidal light-transmitting member 92.

The helical fiber 12 is positioned coaxial with the light-transmitting member 92 and the LED 16.

The light-directing housing 96 in the illustrated embodiment has a top reflector member 98 and a bottom reflector member 100 for directing light from the LED 14 to the light-transmitting member 92. The top reflector member 98 is disk-shaped and covers a top portion of the opening defined by the toroidal light-transmitting member 92. The bottom reflector member 100 is ring-shaped and covers the bottom portion of the opening defined by the toroidal light-transmitting member 92. The LED 14 is received in the opening defined by the ring-shaped bottom reflector member 100. Thus, the light-directing housing 96 guides light from the LED 14 into the light-transmitting member 92, such that light is emitted only through the light-transmitting member 92.

Figure 7B:
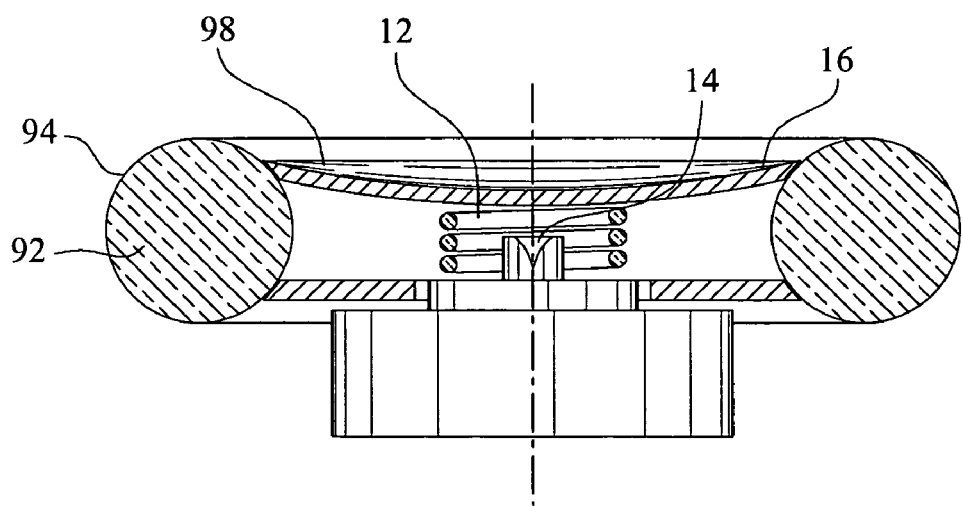

As shown in FIG. 7B, the top reflector member 98 is flexible, allowing it to also serve as the means 16 of adjusting the compression of the helical fiber 12. By adjusting the compressing of the helical fiber 12, the mixture of the light from the LED 14 and the light from the helical fiber 12 reaching the light-transmitting member 92 are adjusted, changing the perceived color of light emitted through the light-transmitting member 92.

F. Sixth Exemplary Embodiment: Light-Transmitting Rod

Figure 8:
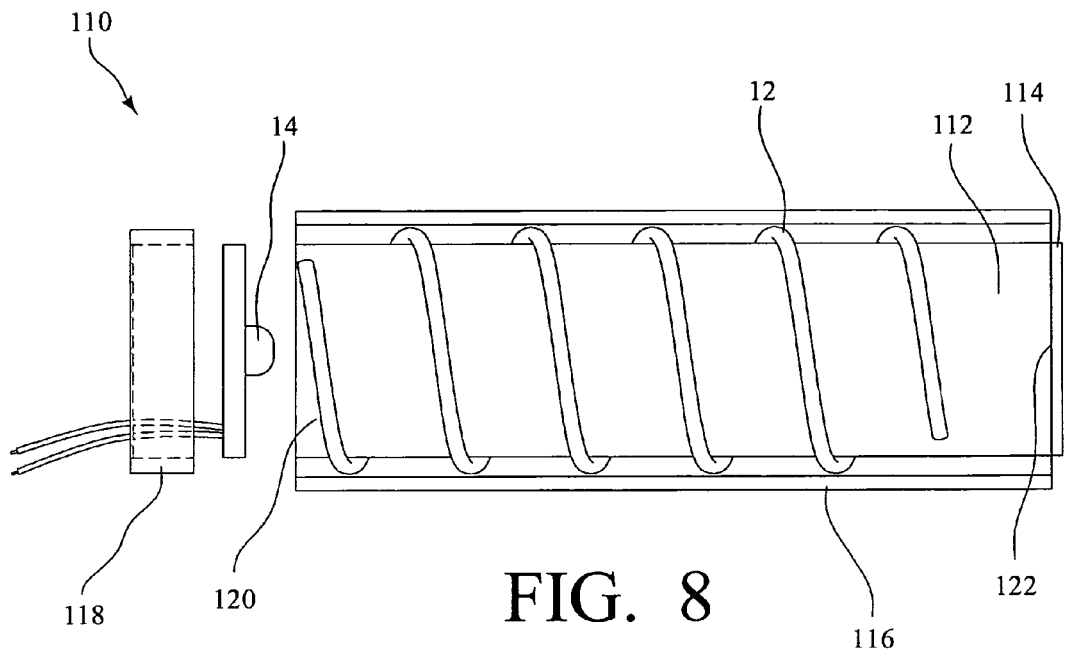
FIG. 8 is an exploded side view of a sixth exemplary embodiment of a LED lighting system according to the invention.

FIG. 8 shows a sixth exemplary embodiment 110 of an LED lighting system having: a helical fiber 12, a LED 14, a light-transmitting rod 112, a reflector 114, a substantially clear outer sheath 116, and a reflective ring/LED holder/heat sink 118. The LED 14 is positioned in the reflective ring/LED holder/heat sink 118 to emit light into a proximal end 120 of the rod 112. Preferably, the LED 14 is a top emitting LED. The helical fiber 12 is positioned around the rod 112, surrounding at least a portion of the rod 112. The reflector 114 caps a distal end 122 of the rod 112 (opposite the LED 14). The substantially clear outer sheath 116 encases the rod 112 and the helical fiber 12.

Figure 9:
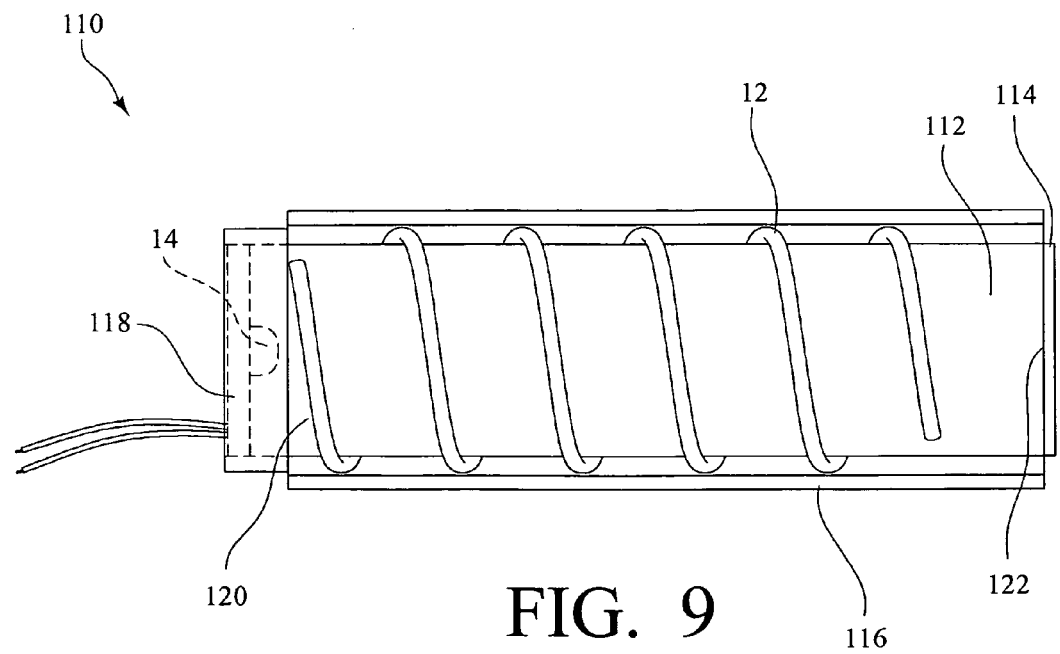
FIG. 9 is a non-exploded side view of the LED lighting system of FIG. 8.

FIG. 9 shows the assembled sixth exemplary embodiment 110 of the LED lighting system. Additionally, the light source could include potting compound (not shown) between the LED 14 and the light-transmitting rod 112. Further, the LED lighting system could include conductive grease (not shown) between the LED 14 and the reflective ring/LED holder/heat sink 118. Additionally, the proximal end 120 of the rod 112 may be smooth or roughed up (lambertian), or curved. The sheath 116 holds index matching fluid (not shown) for optically coupling the rod 112 to the helical fiber 12. Alternatively, if the rod 112 is made of a scattering material, such as DR acrylic, then the sheath 116 and index matching fluid is not needed for coupling the rod 112 to the helical fiber 12.

In operation, light is generally directed along the axis of the rod 112, which acts as a waveguide. Index matching fluid breaks the interface between the helical fiber 12 and the rod 112, and causes the helical fiber 12 to receive a portion of the light emitted from the rod 112. The wavelength converting material of the helical fiber 12 causes the light passing through the helical fiber 12 to have a color different than that of the LED 14. The reflector 114 also directs light into the helical fiber 12. Further, another reflector or mirror (not shown) could be positioned at the proximal end 120 of the rod 112 to direct light into the helical fiber 12. Thus, the helical fiber 12 acts as a "filament."

The color (or hue) of the emitted light is controlled depending on the following six variables: (a) the wavelength or color of the light emitted by the LED 14; (b) the density of the windings of the helical fiber 12; (c) the cross-sectional shape of the helical fiber 12; (d) the thickness of the helical fiber 12; (e) the color and density of the dyes in the helical fiber 12; and (f) the color and density of any dyes in the rod 112 or sheath 116. Although many of the variables must be pre-established, the density of the windings of the helical fiber 12 can be readily altered.

Figure 10A:
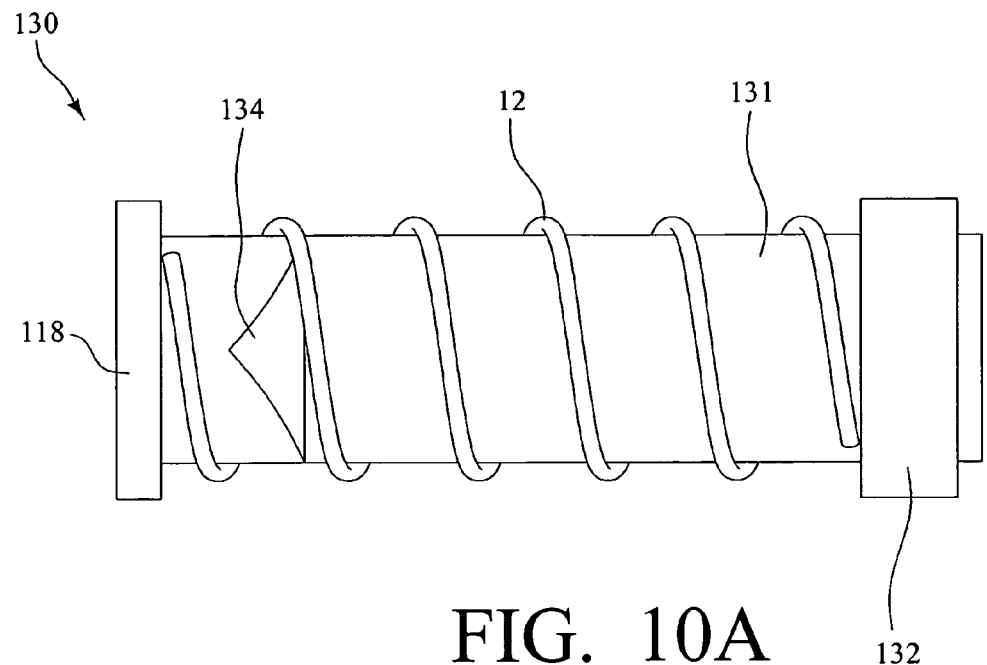
FIG. 10A and FIG. 10B are side views of a seventh exemplary embodiment of a LED lighting system according to the invention.
Figure 10B:
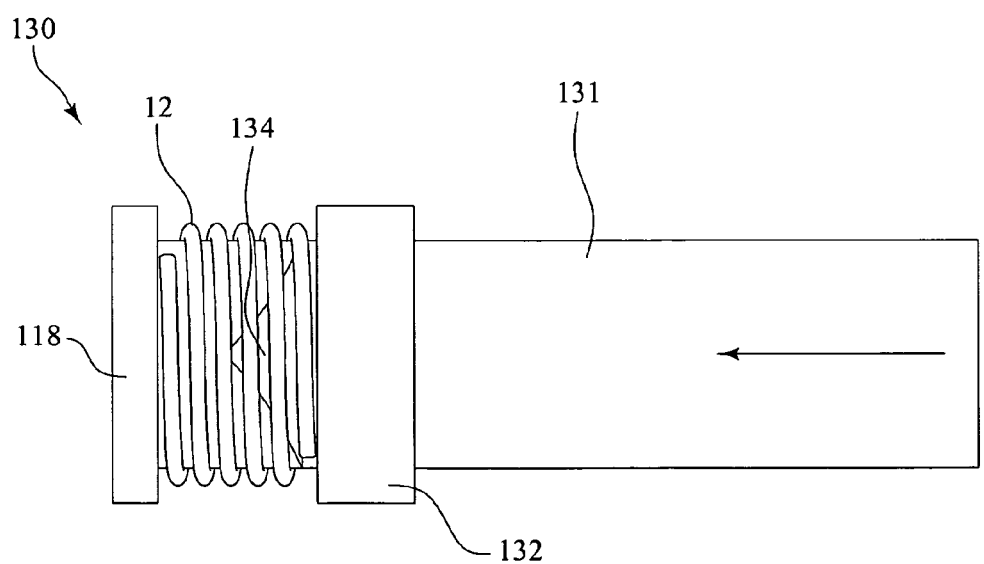

G. Seventh Exemplary Embodiment: Light-Transmitting Tube with Solenoid Adjustment In a seventh exemplary embodiment 130 as shown in FIGS. 10A and 10B, a solenoid 132 could be used to compress the helical fiber 12. The seventh exemplary embodiment 130 has a light-transmitting tube 131 having a formed reflector 134 in the middle to direct light out the sides of the rod 112. It should be noted that means of compression, other than the solenoid 132, could be employed. Additionally, other reflector arrangements could be employed without departing from the teachings of the invention. For instance, the formed reflector 134 could be moved along the length of the rod 112 to achieve a desired effect.

By altering the density of the windings of the helical fiber 12 in this manner, the color (or hue) of the emitted light can be altered as desired. Significantly, the amount of unaltered light allowed to escape is much greater in FIG. 10A than it is in FIG. 10B. In FIG. 10B, the hue shifts away from the unaltered color of the light emitted from the LED 14 and toward the hue of the light emitted by the wavelength converting material of the helical fiber 12.

If phosphorescent dye is used, the helical fiber 12 will continue to emit light even after the LED 14 is turned off. This "after glow" can be projected if the LED light source is placed at the focal point of a reflector or collector system.

Additional advantages may be obtained by adding dye to the tube 131.

Figure 11A:
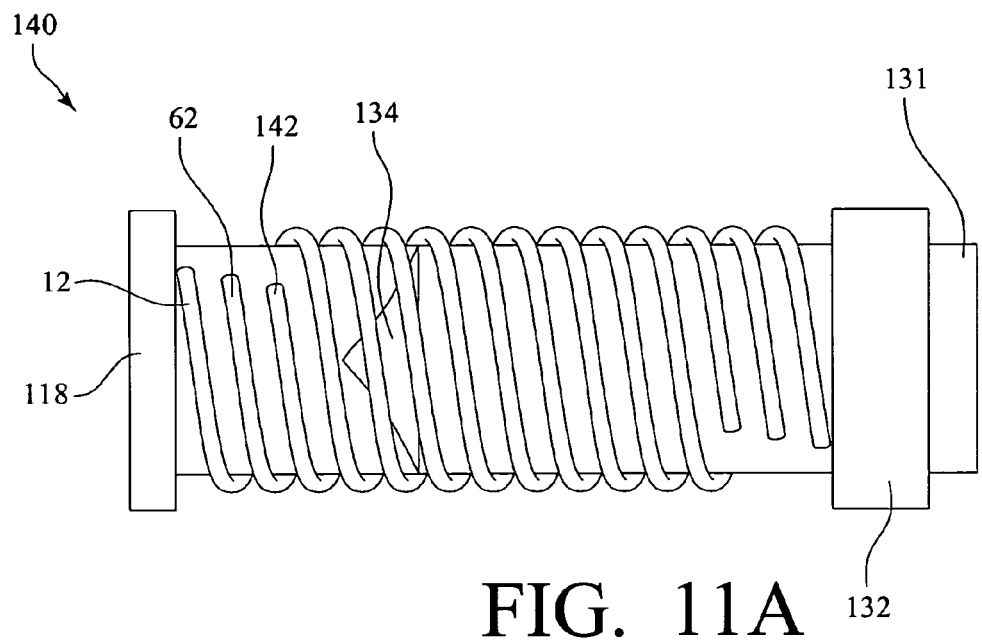
FIG. 11A and FIG. 11B are side views of an eighth exemplary embodiment of a LED lighting system according to the invention.
Figure 11B:
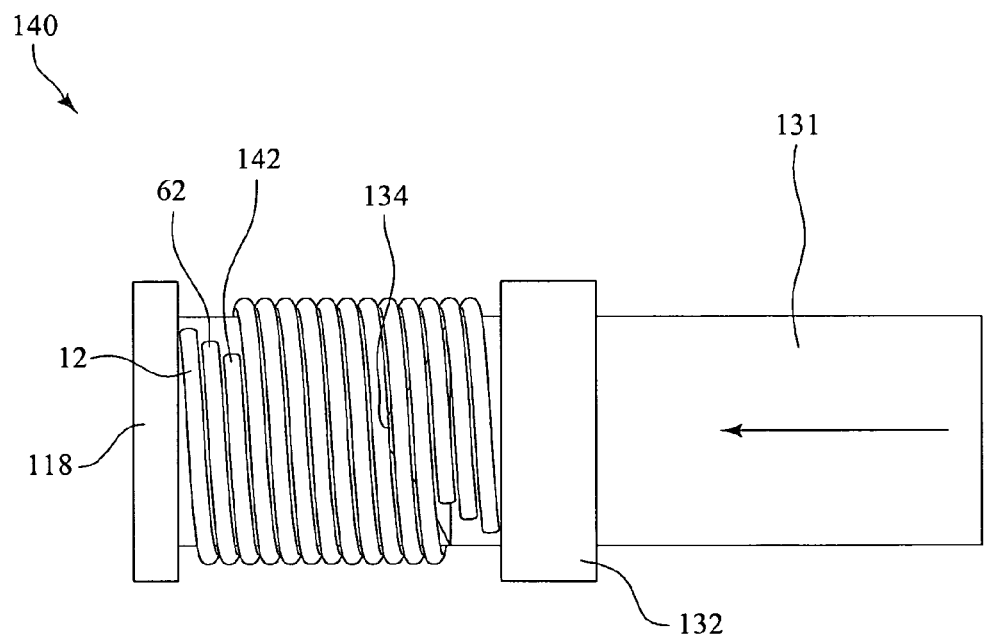

H. Eighth Exemplary Embodiment: Light-Transmitting Tube with Multiple Parallel Wound Helical Fibers FIG. 11A and 11B show an eighth exemplary embodiment 140 having multiple helical coils 12, 62, 142, each doped with a different wavelength converting material. The multiple helical coils 12, 62, 142 are wound in parallel.

Figure 12A:
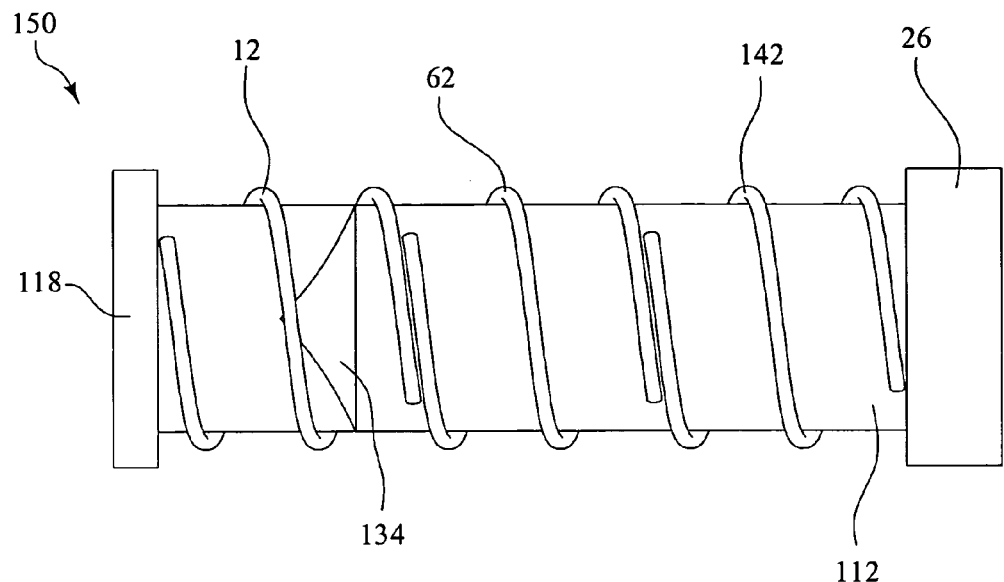
FIG. 12A and FIG. 12B are side views of a ninth exemplary embodiment of a LED lighting system according to the invention.
Figure 12B:
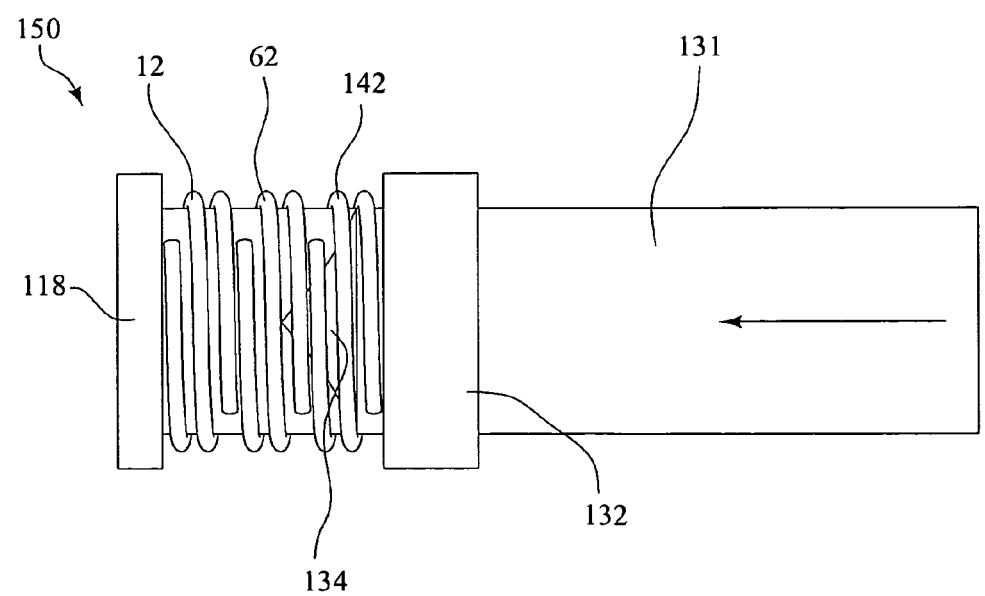

I. Ninth Exemplary Embodiment: Light-Transmitting Tube with Multiple Helical Fibers Wound in Separate Sections FIGS. 12A and 12B show a ninth exemplary embodiment 150 having multiple helical coils 12, 62, 142, each doped with a different wavelength converting material. The multiple helical coils 12, 62, 142 are wound in separate sections.

J. Tenth Exemplary Embodiment: Bulb-Shaped Rod

Figure 13:
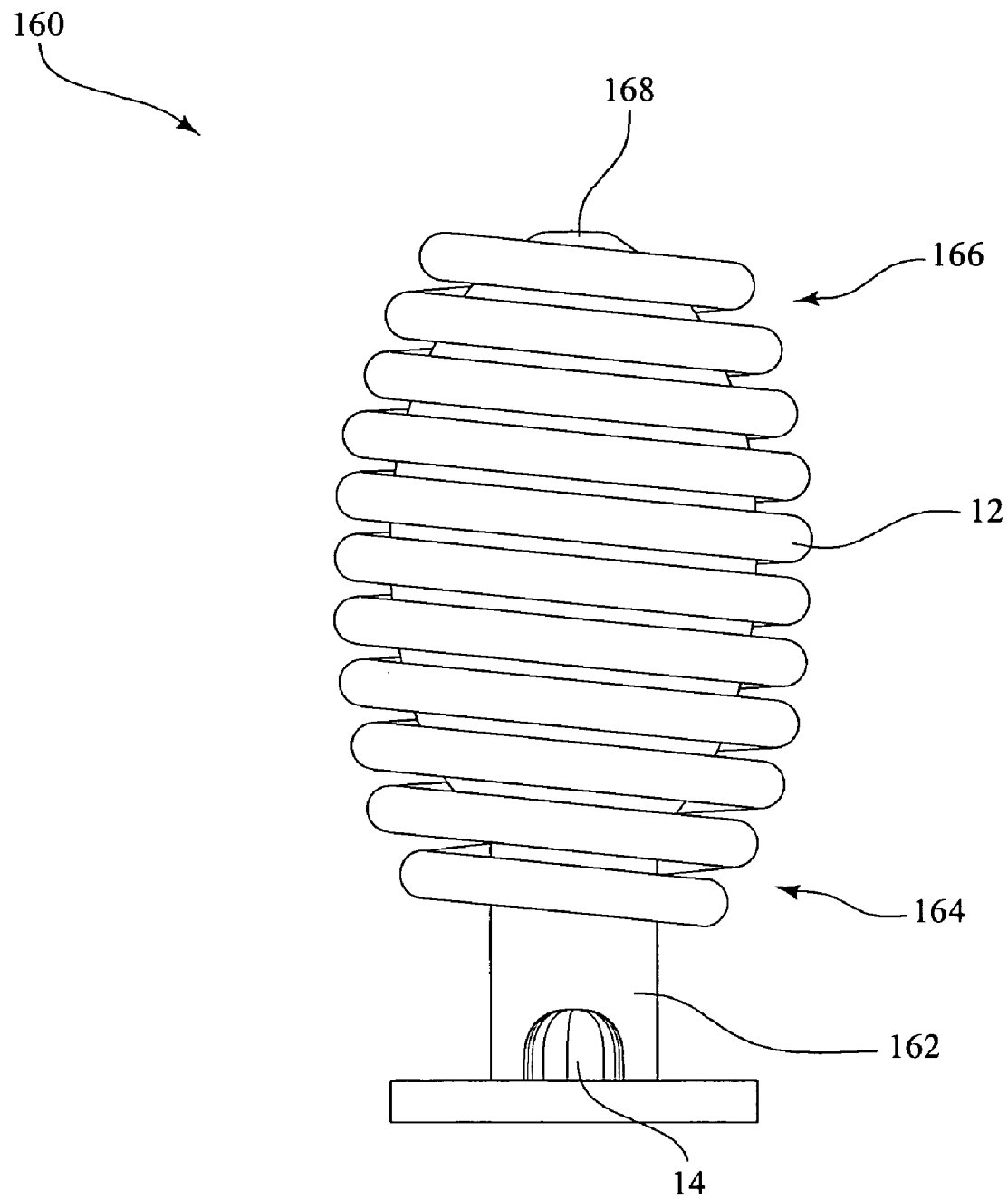
FIG. 13 is a side view of a tenth exemplary embodiment of a LED lighting system according to the invention.

FIG. 13 shows a tenth exemplary embodiment 160 of a LED lighting system. The tenth embodiment 160 has a bulb-shaped rod 162 having a proximal end 164 and a distal end 166, and a reflector 168 positioned at the distal end 166. An LED (not shown) can be positioned to emit light into the proximal end 164 of the bulb-shaped rod 162. In one variation, the bulb 36 is doped with a dye. A helical fiber 12 is positioned around the bulb-shaped rod 162. The helical fiber 12 is doped with a wavelength converting material.

K. Eleventh Exemplary Embodiment: Dome-Shaped Spiral Fiber

Figure 14:
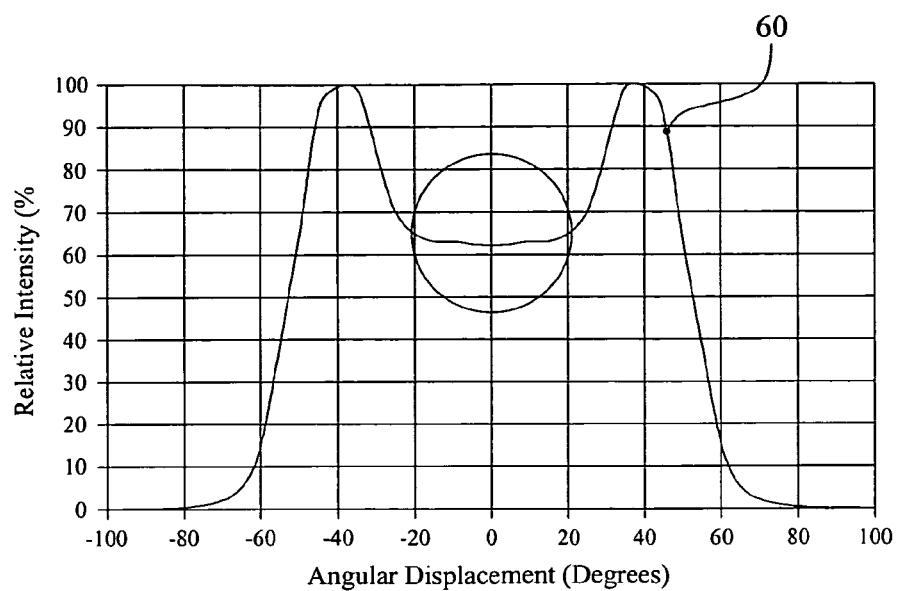
FIG. 14 is a graph of a radiation pattern produced by an exemplary LED.

Selection of dye migration resistant geometry and materials will provide LED lighting systems having reduced or eliminated dye migration. One aspect of the dye migration resistant geometry is selection of an LED that has a substantially uniform portion across its radiation intensity pattern. For example, FIG. 14 shows a radiation pattern 170, called a batwing pattern, produced by LED model/part no. LXHL-MB1C available from Lumileds Lighting, U.S. LLC. As shown, the radiation pattern 170 is fairly uniform in the central region, from about −20 to +20 degrees. However, radiation intensity gradients that could cause dye migration exist outside of the central region.

Figure 15:
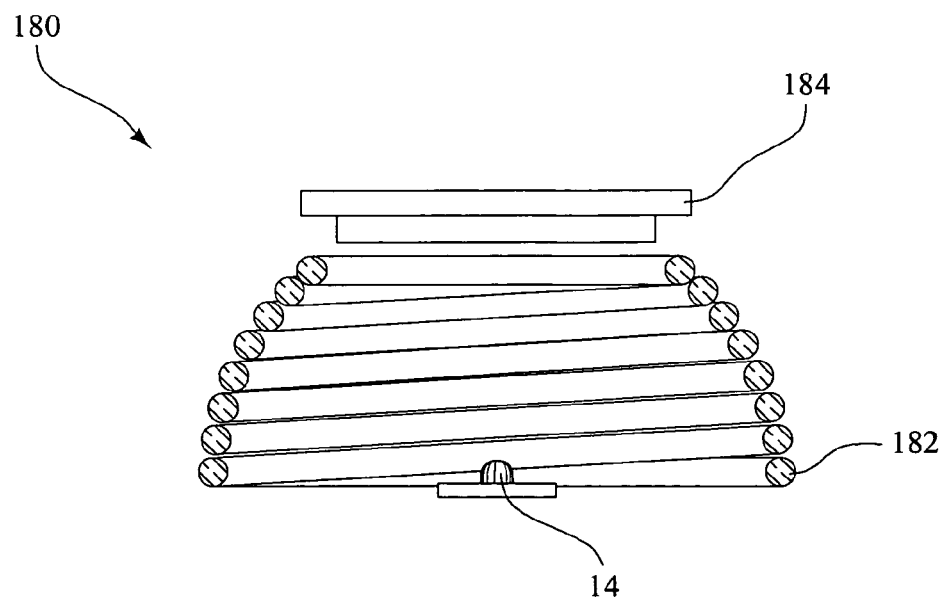
FIG. 15 is a side sectional view of an eleventh exemplary embodiment of an LED lighting system according to the invention.

FIG. 15 shows an eleventh exemplary embodiment of an LED lighting system having an LED 14, a dome-shaped helical fiber 182, and an end cap 184. More specifically, in this embodiment, the LED 14 is selected to have a substantially uniform radiation intensity pattern in a central region extending about 20 degrees around the radiation axis of the LED 14, such as the Lumiled LED described above. The end cap 184 is spaced from the LED 14 and positioned such that its edges intersect the uniform radiation intensity pattern of the LED 14, corresponding to the flat region shown in the batwing distribution. The end cap 184 can be either a transparent or translucent material doped with a dye. Since the radiation intensity pattern is substantially uniform across the end cap 184, migration of any dye is minimized. The end cap 184 can also be a reflective material. The dome-shaped helical fiber 182 is centered on the radiation axis of the LED 14 between the LED 14 and the end cap 184. The diameter of the fiber is selected such that there is there is less than a 10% change in relative intensity at any point in the helical fiber 182.

Figure 16:
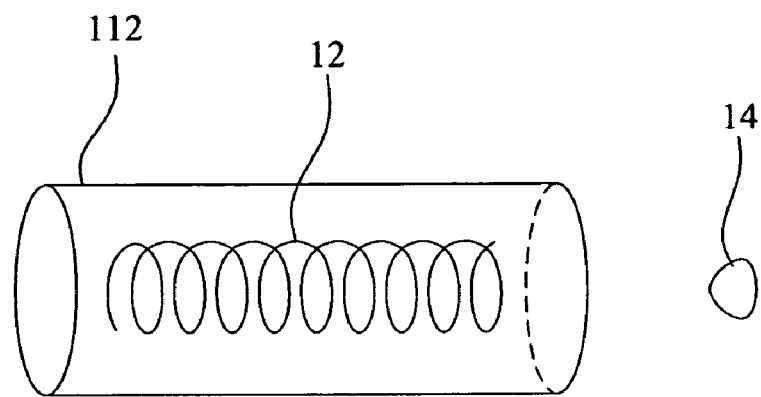
FIG. 16 is a side view of an twelfth exemplary embodiment of an LED lighting system according to the invention.
Figure 17:
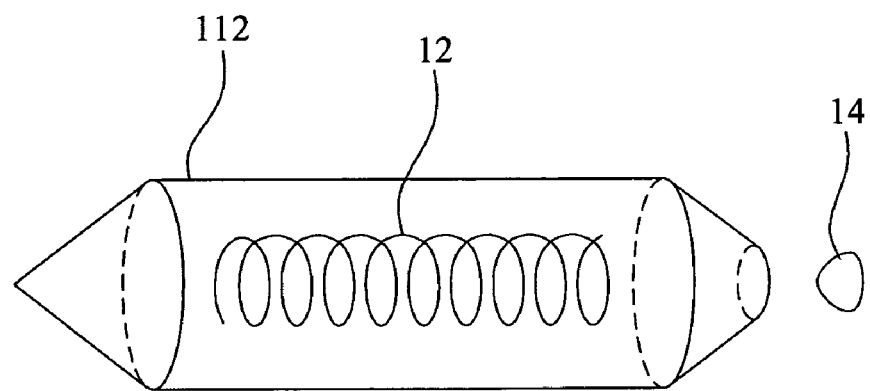
FIG. 17 is a side view of a variation of the exemplary embodiment of an LED lighting system of FIG. 16.

K. Twelfth Exemplary Embodiment: Helical Fiber Encased in Light-Transmitting Rod FIG. 16 and FIG. 17 show a twelfth exemplary embodiment of the invention, having an LED 14, a helical fiber 12, and a light-transmitting rod 112. The helical fiber 12 is encased in the light-transmitting rod 112. Light emitted by the LED 14 is confined by the light-transmitting rod 112 and will be symmetrically distributed perpendicular to the axis. The light-transmitting rod 112 can be clear or scattering. With respect to FIG. 17, the distal end of the light-transmitting rod is painted or taped to reflect the light.

One of ordinary skill in the art will also recognize that additional embodiments are possible without departing from the teachings of the present invention or the scope of the claims which follow. This detailed description, and particularly the specific details of the exemplary embodiment disclosed therein, is given primarily for clarity of understanding, and no unnecessary limitations are to be understood therefrom, for modifications will become obvious to those skilled in the art upon reading this disclosure and may be made without departing from the spirit or scope of the claimed invention.

What is claimed is:

1. A lighting system comprising:
   a first helical light-transmitting fiber formed in the shape of a helix, said first helical fiber being doped with a first wavelength converting material, said first helical fiber defining a helical axis; and a light-emitting diode (LED) having a light-emitting portion for emitting light of a first color, said LED aligned axially with said first helical fiber, such that a portion of any light emitted by said LED will pass through the open space between the turns of said first helical fiber and a portion of any light emitted by said LED will be received by said first helical fiber and converted to light of a second color.

2. The lighting system of claim 1, wherein said first helical fiber further defines a cylindrical interior space, wherein said LED is a side-emitting LED having a light-emitting portion, and wherein said LED light-emitting portion is positioned within said first helical fiber cylindrical interior space.

3. The lighting system of claim 2, further having a cup-shaped light-collecting and mixing element having a side wall, a closed end, an open end and an interior area and being aligned axially with said first helical fiber such that said LED light-emitting portion and said first helical fiber are received within said light-collecting and mixing element interior area, whereby said light-collecting and mixing element collects and mixes both the light of a first color and the light of a second color, and directs the mixed light out the open end.

4. The lighting system of claim 3, further comprising a means of adjusting the compression of said first helical fiber for adjusting the amount of open space between the turns of said first helical fiber, thereby changing the percentages of the light of the first color and the light of the second color that are emitted by the lighting system.

5. The lighting system of claim 4, wherein said side-emitting LED further has a base portion for providing for mechanical and electrical connection of said side-emitting LED, and wherein said means of adjusting the compression of said first helical fiber includes a first separating element and a first plunger assembly, said first separating element separating said first plunger assembly from said LED base portion, said first helical fiber positioned between said first plunger assembly and said LED base portion.

6. The lighting system of claim 5, wherein said separating element is a light-transmitting tube, and wherein said plunger assembly includes a threaded shaft and a threaded shaft-receiving nut, said LED base portion connected at one end of said light-transmitting tube, said threaded shaft-receiving nut connected at the other end of said light-transmitting tube, said first helical fiber positioned in the interior of the light-transmitting tube, said threaded shaft rotationally received in said threaded shaft-receiving nut, one end of said shaft adjacent one end of said first helical fiber such that rotation of said threaded shaft will adjust the compression of said first helical fiber and the open space between the turns of said first helical fiber.

7. The lighting system of claim 6, further having a light-transmitting element positioned around an outer portion of the light-transmitting tube, said light-transmitting element doped with a second wavelength converting material.

8. The lighting system of claim 6, further having a light-reflecting element positioned around a portion of the interior surface of the light-collecting and mixing element, said light-reflecting element containing a second wavelength converting material.

9. The lighting system of claim 1, further having a second helical fiber having a diameter that is larger than the diameter of said first helical fiber, said second helical fiber positioned around and aligned axially with said first helical fiber, said second helical fiber being doped with a second wavelength converting material, such that a portion of any light emitted by said LED will pass through the open spaces between the turns of said second helical fiber, and a portion of any light emitted by said side-emitting LED will be received by said second helical fiber and converted to light of a third color.

10. The lighting system of claim 9, wherein said first helical fiber further defines a cylindrical interior space, wherein said LED is a side-emitting LED having a light-emitting portion, and wherein said LED light-emitting portion is positioned within said first helical fiber cylindrical interior space.

11. The lighting system of claim 10, further having a cup-shaped light-collecting and mixing element having a side wall, a closed end, an open end and an interior area and being aligned axially with said first helical fiber such that said LED light-emitting portion, said first helical fiber, and said second helical fiber are received within said light-collecting and mixing element interior area, whereby said light-collecting and mixing element collects and mixes both the light of a first color, the light of a second color, and the light of a third color, and directs the mixed light out the open end.

12. The lighting system of claim 11, further comprising a means of adjusting the compression of said first helical fiber, and a means of adjusting the compression of said second helical fiber, for adjusting the amount of open space between the turns of said first helical fiber and the amount of open space between the turns of said second helical fiber, thereby changing the percentages of the light of the first color, the light of the second color, and the light of the third color emitted by the system.

13. The lighting system of claim 12,
wherein said side-emitting LED further has a base portion for providing mechanical and electrical connection of said side-emitting LED,
wherein said means of adjusting the compression of said first helical fiber includes a first light-transmitting tube and a cylindrical plunger slidingly received within said first light-transmitting tube, said first light-transmitting tube positioned between said first helical fiber and said second helical fiber, said first helical fiber positioned between said LED base portion and said cylindrical plunger, and
wherein said means of adjusting the compression of said second helical fiber includes a second light-transmitting tube and a tubular plunger slidingly received within said second light-transmitting tube, said second light-transmitting tube positioned around said second helical fiber, said second helical fiber positioned between said LED base portion and said tubular plunger.

14. The lighting system of claim 13, wherein said tubular plunger has a longitudinal slot for allowing support structure to extend between said second light-transmitting tube and said first light-transmitting tube in order to hold said first light-transmitting tube in a fixed position.

15. The lighting system of claim 1, further having:
a toroidal light-transmitting member having optical waveguide and light-scattering characteristics, and positioned coaxial with said first helical fiber; and
a light-directing housing for guiding light from said LED and said first helical fiber into said light-transmitting member, such that said toroidal light-transmitting member will emit light having a substantially uniform intensity or brightness for simulating neon lighting in the shape of a toroid.

16. The lighting system of claim 15, wherein said light-directing housing has:
 a disk-shaped top reflector member covering a top portion of an opening defined by the toroidal light-transmitting member; and
 a ring-shaped bottom reflector member covering a bottom portion of said opening defined by said toroidal light-transmitting member, said LED being received in an opening defined by said ring-shaped bottom reflector member.

17. The lighting system of claim 16, wherein said top reflector member is flexible for adjusting the compression of said first helical fiber.

18. The lighting system of claim 1, further comprising:
 a light-transmitting rod positioned such that at least a portion of said light-transmitting rod is inside of said first helical fiber, said light-transmitting rod having a proximate end and a distal end; and
 a reflector capping said distal end of said light-transmitting rod;
 wherein said LED is a top-emitting LED positioned to emit light into said proximate end of said light-transmitting rod.

19. The lighting system of claim 18, wherein said light-transmitting rod is made of a light-scattering material for optically coupling said first helical fiber to said light-transmitting rod.

20. The lighting system of claim 18, further having:
 a substantially clear outer sheath encasing said light-transmitting rod and said first helical fiber; and
 index matching fluid filling the void between said outer sheath and said light-transmitting rod for optically coupling said first helical fiber to said light-transmitting rod.

21. The lighting system of claim 18, wherein said light-transmitting rod is bulb-shaped.

22. The lighting system of claim 1, further comprising:
 a light-transmitting tube positioned such that at least a portion of said light-transmitting tube is inside of said first helical fiber;
 a formed reflector inside of said tube to direct light out the sides of said tube; and
 and a means of adjusting the compression of said first helical fiber for adjusting the amount of open space between the turns of said first helical fiber, thereby changing the percentages of the light of the first color and the light of the second color that are emitted by the lighting system.

23. The lighting system of claim 22, wherein said means of adjusting the compression of said first helical fiber is a solenoid.

24. The lighting system of claim 22, further comprising a second helical light-transmitting fiber doped with a second wavelength converting material and a third helical light-transmitting fiber doped with a third wavelength converting material, said first helical fiber, second helical fiber, and third helical fiber being wound in parallel around said light-transmitting tube.

25. The lighting system of claim 22, further comprising a second helical light-transmitting fiber doped with a second wavelength converting material and a third helical light-transmitting fiber doped with a third wavelength converting material, said first helical fiber, second helical fiber, and third helical fiber being wound in separate sections around said light-transmitting tube.

26. The lighting system of claim 1, wherein said LED has a batwing radiation pattern having a uniform central region around the radiation axis of said LED, wherein said first helical fiber is formed in the shape of a substantially dome-shaped helix having an open top corresponding to said LED radiation pattern uniform central region, and further having an end-cap sized to have a circular edge corresponding to said first helical fiber open top and positioned such that said edge intersects said uniform radiation intensity pattern of said LED, said diameter of said first helical fiber selected such that there is less than a ten percent change in relative intensity at any point in said first helical fiber.

27. The lighting system of claim 1, further having a light-transmitting rod encasing said first helical fiber, said light-transmitting rod and said first helical fiber aligned co-axially, said light-transmitting rod having a proximate end, wherein said LED is a top-emitting LED positioned to emit light into said proximate end of said light-transmitting rod.

28. The lighting system of claim 27, wherein said light-transmitting rod further has a distal end having a light-reflecting coating for reflecting light back into said light-transmitting rod.

* * * * *